(12) United States Patent
Pearson

(10) Patent No.: US 7,904,430 B2
(45) Date of Patent: Mar. 8, 2011

(54) END-USER PORTAL SESSION LOGGING BY PORTLETS

(75) Inventor: Larry B. Pearson, San Antonio, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 386 days.

(21) Appl. No.: 11/199,912

(22) Filed: Aug. 9, 2005

(65) Prior Publication Data

US 2007/0038599 A1 Feb. 15, 2007

(51) Int. Cl.
*G06F 7/00* (2006.01)
*G06F 17/00* (2006.01)

(52) U.S. Cl. .......................... 707/688; 707/672
(58) Field of Classification Search .................. None
See application file for complete search history.

(56) References Cited

U.S. PATENT DOCUMENTS

| | | | |
|---|---|---|---|
| 6,018,619 A * | 1/2000 | Allard et al. ............... | 709/224 |
| 6,133,912 A * | 10/2000 | Montero ..................... | 715/716 |
| 7,185,089 B2 * | 2/2007 | Satomi et al. ............... | 709/224 |
| 2002/0029296 A1 * | 3/2002 | Anuff et al. ................ | 709/311 |
| 2003/0078942 A1 * | 4/2003 | Childress et al. .......... | 707/200 |
| 2003/0123424 A1 * | 7/2003 | Jung .......................... | 370/338 |
| 2003/0154398 A1 * | 8/2003 | Eaton et al. ................ | 713/201 |
| 2003/0191829 A1 * | 10/2003 | Masters et al. ............ | 709/223 |
| 2004/0049589 A1 * | 3/2004 | Papanikolaou et al. .... | 709/229 |
| 2004/0054749 A1 * | 3/2004 | Doyle et al. ............... | 709/217 |
| 2004/0083292 A1 * | 4/2004 | Lueckhoff et al. ......... | 709/227 |
| 2005/0038849 A1 * | 2/2005 | Kaluskar et al. ........... | 709/203 |
| 2005/0278562 A1 * | 12/2005 | Haynes et al. ............. | 714/4 |
| 2006/0053376 A1 * | 3/2006 | Ng et al. .................... | 715/742 |
| 2006/0059125 A1 * | 3/2006 | Yan ........................... | 707/3 |
| 2006/0117091 A1 * | 6/2006 | Justin ......................... | 709/217 |
| 2006/0212585 A1 * | 9/2006 | Eaton et al. ............... | 709/227 |

\* cited by examiner

*Primary Examiner* — Pierre M Vital
*Assistant Examiner* — Augustine Obisesan
(74) *Attorney, Agent, or Firm* — Toler Law Group

(57) ABSTRACT

A portal uses portlets to provide a session to a user. Based on portlet events that occur in the session, portlet log entries are sent from the portlets to a log server. The log server stores log entries comprising the portlet log entries and the portal log entries. A customer service representative in communication with the user is provided a display of an activity of the user in the session based on the log entries from the log server.

11 Claims, 6 Drawing Sheets

FIG. 3

END-USER PORTAL SESSION LOGGING BY PORTLETS

FIELD OF THE DISCLOSURE

The present disclosure relates to portals and portlets.

BACKGROUND

A portal is a computer application that provides a single starting point for retrieving and aggregating content from multiple, divergent sources. The portal may be a Web site that is a major starting site for users when the users connect to the Web. Either alternatively or additionally, the portal may be a Web site that users tend to visit as an anchor site. Either way, the portal may provide a presentation layer of content aggregated from different sources and may provide links to many other Web sites.

The portal may offer a wide variety of resources, services, and links. Typical services offered by portal sites include providing a directory of Web sites, providing an ability to search for information, providing e-mail capabilities, providing a community forum, providing on-line shopping, and providing information such as news, weather, stock quotes, phone information and maps.

The services offered by a portal may be customized to a particular audience. Some portals offer services that are customized to a particular industry, occupation, or field. For example, a Web-based bank portal may enable customers to access their checking, savings, and investment accounts.

In addition, the portal may provide personalization and single sign-on. The EXCITE portal is an example of a portal that offers users the ability to personalize a Web site according to individual interests.

Portals can use portlets to enable direct interactive manipulation of applications from divergent sources through a single Web user interface. A portlet is a Web component, usually managed by a container, that processes requests and generates dynamic content. Portals can use the portlets as pluggable, user interface components to provide a presentation layer to information systems.

Portlets are reusable components and can provide access to Web-based content, applications, and other resources. Examples of portlets include an email portlet, a weather portlet, a discussion forums portlet, and a news portlet.

Two standard portal methodologies that support portlets are JAVA JSR168 from Sun Microsystems and OASIS Web Services for Remote Portlets (WSRP). JSR168 portlets run in the same execution environment as the portal server itself. In contrast, WSRP portlets run outside of the portal server execution environment. Thus, whereas the JSR168 portlets run on the same computer as the portal web server, the WSRP portlets run on a different computer than the portal web server. For both JSR168 and WSRP portlets, the portlets run independently of the portal, and independently of each other. Proprietary portal/portlet methodologies may also be implemented.

WSRP portlets deliver content to a portal along with presentation information so that their WSRP services appear and operate to portal users like local portlets (e.g. like JSR168 portlets). On the portal side, a single, service-independent adapter is sufficient to integrate any WSRP service. Portal administrators are not required to write interface code to adapt WSRP services for their portal. Thus, with WSRP, a portal can integrate content and applications without custom programming and without using a variety of different interfaces and protocols.

Many businesses have Web-based portals that are used by their customers. If a customer has a question or a problem regarding a product or a service included in the portal, he/she may call a customer support telephone number for the business. However, a customer support representative who fields the call may have visibility to only a subset of the products in the customer's portfolio. This may occur if the business segregates its customer support along product families or individual products. In general, customer support can be problematic if the business has separate operations and support teams for its various products.

BRIEF DESCRIPTION OF THE DRAWINGS

The present invention is pointed out with particularity in the appended claims. However, other features are described in the following detailed description in conjunction with the accompanying drawings in which:

FIG. 3 is a view of a portal page composed of the portlets;

DETAILED DESCRIPTION OF THE DRAWINGS

Embodiments of the present disclosure provide a centralized logging system to log customers' interaction with portals that use portlets. The system aggregates logs from each service element, including portals and portlets, while preserving customer security and privacy.

Using the system, a customer support representative who fields a call from a customer is given visibility to all of the products and services in a customer's portfolio, even if the business has separate operations and support teams for its various products and services. This promotes a single support channel where customers can call one telephone number and have their problems solved by the customer service representative who answers the call. Further, this system mitigates a likelihood of customers being bounced back and forth between call centers.

Figure 1:
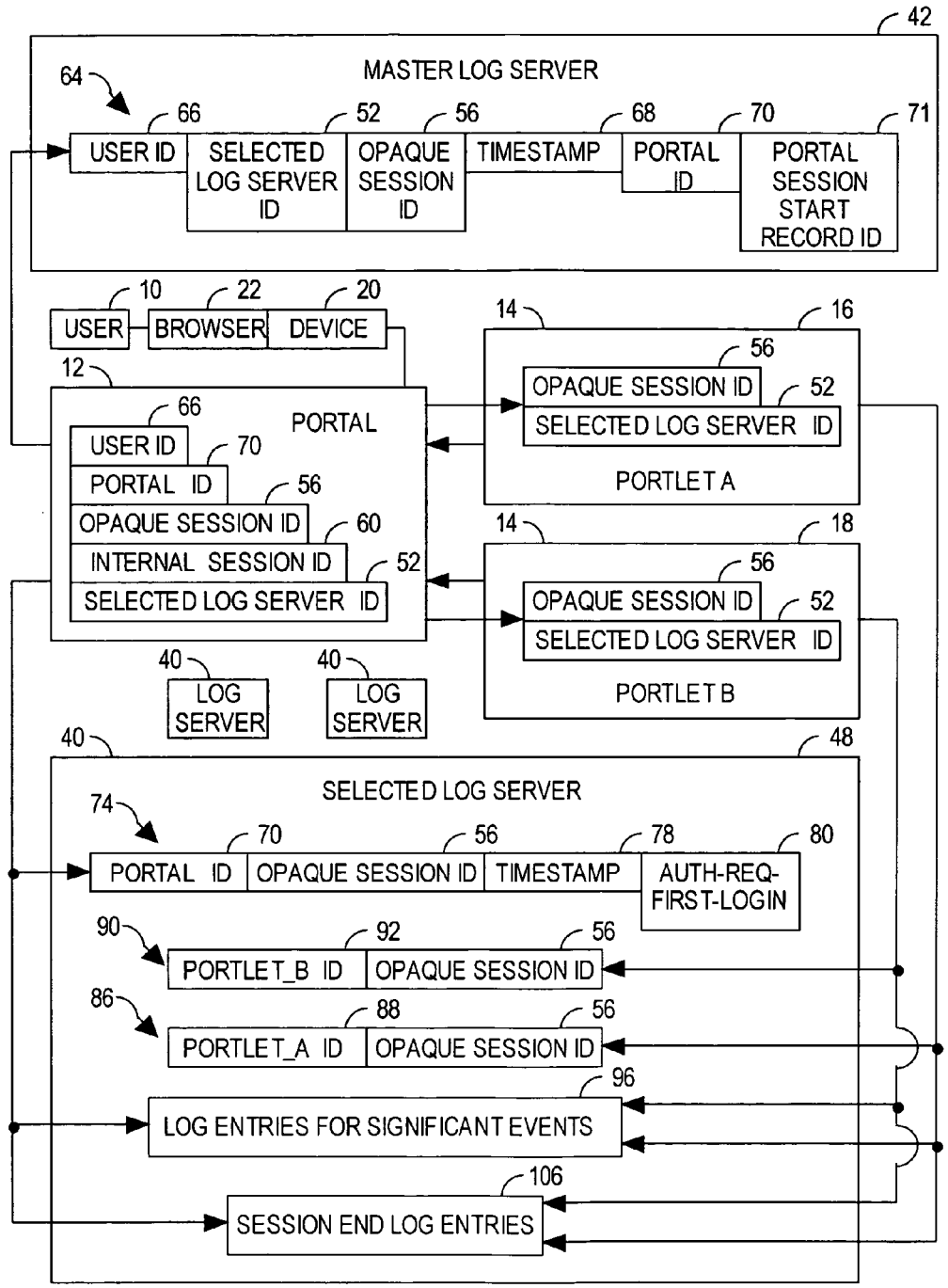
FIG. 1 is a block diagram of an embodiment of a system for logging a session of a user of a portal.

FIG. 1 is a block diagram of an embodiment of a system for logging a session of a user 10 of a portal 12. The portal 12 uses multiple portlets 14 that run independently from the portal 12 to provide the session to the user 10. In general, the portal 12 may use any number of portlets. However, for purposes of illustration and example, the multiple portlets 14 comprise a first portlet 16 and a second portlet 18.

The portal 12 is provided by a portal server computer. Any one or more of the portlets 14 may run on the portal server computer in the same execution environment as the portal 12. Further, any other one or more of the portlets may run on one or more portlet server computers other than the portal server computer. Each portlet server computer may provide one portlet or multiple portlets.

In some embodiments, all of the portlets run on portlet server computers other than the portal server computer, such as in a WSRP implementation. In other embodiments, all of the portlets run on the portal server computer, such as in a JSR 168 implementation.

For purposes of illustration and example, the first portlet 16 is considered to be provided by a first portlet server other than the portal server, and the second portlet 18 is considered to be provided by a second portlet server other than the first portlet server and the portal server.

The user 10 uses a network-enabled device 20 having a browser 22 or an alternative client program to display a page outputted by the portal 12. Examples of the network-enabled device 20 include, but are not limited to, a computer, a personal digital assistant, a wireless telephone, and an Internet Protocol Television (IPTV) receiver. The network-enabled device 20 accesses the portal 12 over a computer network such as the Internet, an intranet, an extranet, or a 3G wireless network.

The portal 12 provides the overall structure, layout, and look-and-feel for the page. The portlets 14 provide application-specific information for the page.

Figure 2:
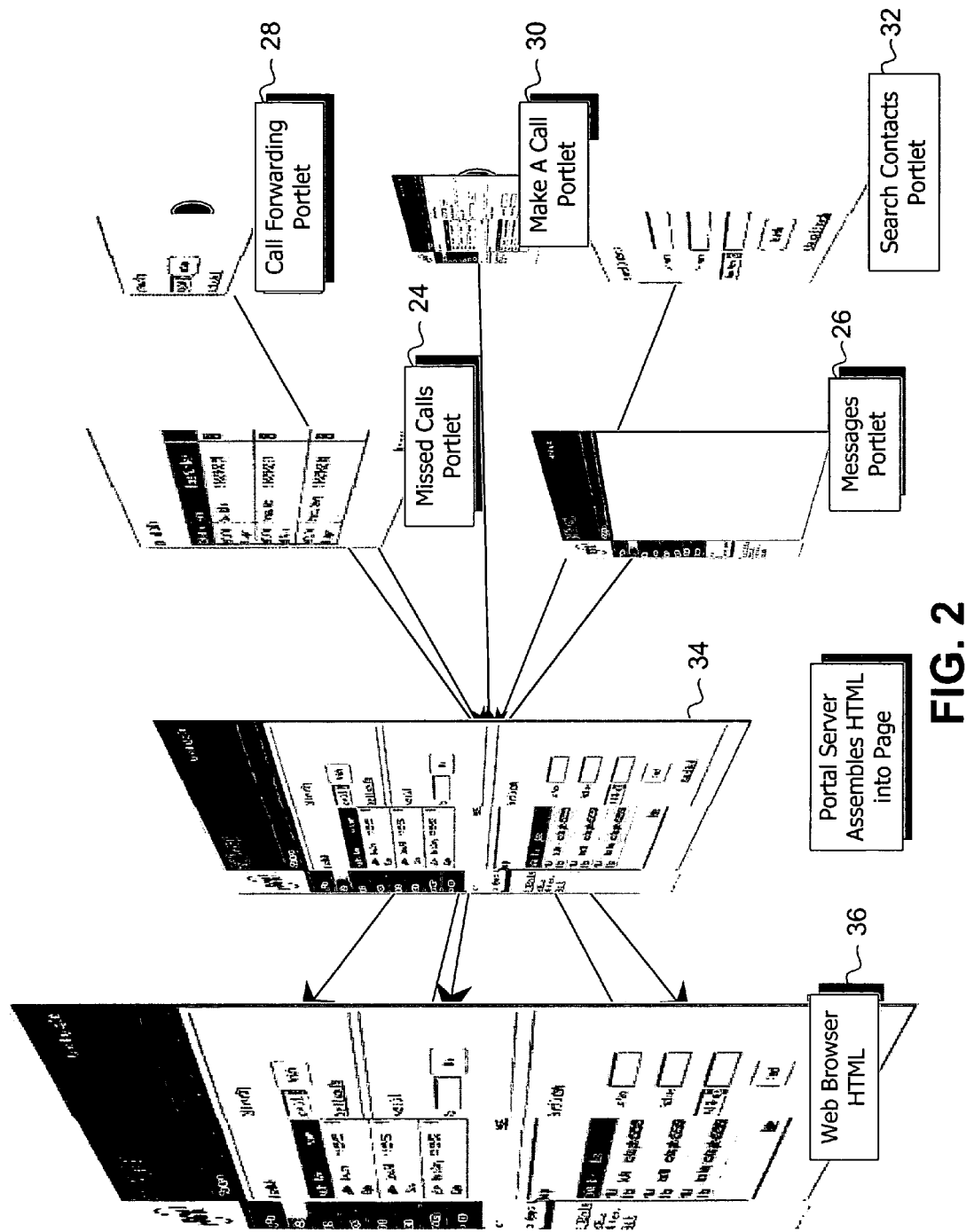
FIG. 2 is an example of portlets in a telecommunication application.

FIG. 2 shows an example of the portlets 14 in a telecommunication application. The portlets 14 comprise a missed calls portlet 24, a messages portlet 26, a call-forwarding portlet 28, a make-a-call portlet 30, and a search-contacts portlet 32. Based on an overall page structure 34, the portal 12 assembles content from the portlets 24, 26, 28, 30, and 32 to form a portal page 36. The portal page 36 may be in a markup language such as HTML, for example. The portal page 36 is displayed to the user 10 by the browser 22 of the network-enabled device 20. The user 10 may be a customer of a telecommunication company that provides the portal page 36.

Figure 3:
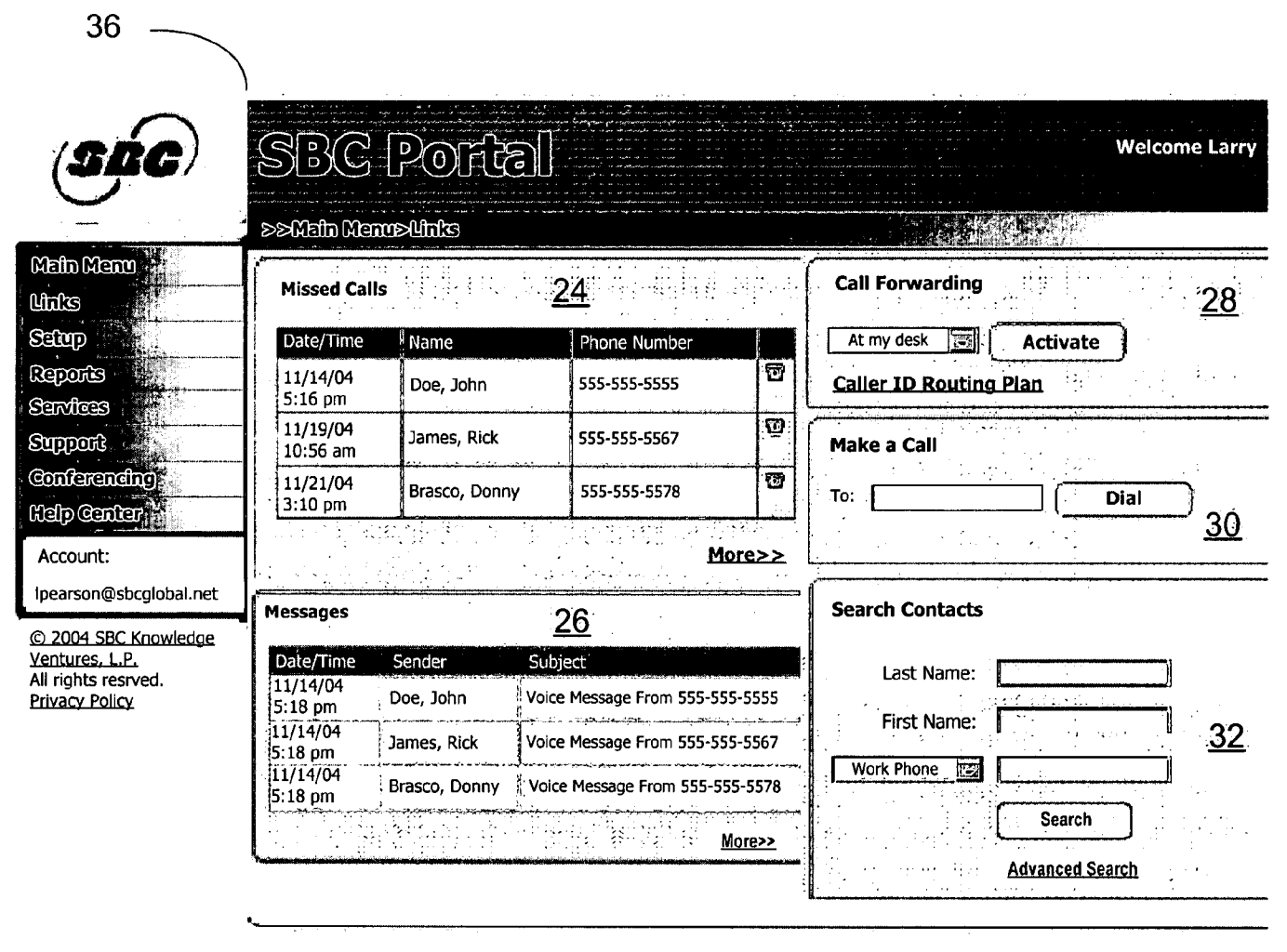

FIG. 3 provides another view of the portal page 36 composed of the portlets 24, 26, 28, 30, and 32. The portal page 36 provides an integrated view of products and services provided by the telecommunication company.

Referring back to FIG. 1, the system comprises multiple log servers 40 to log sessions of multiple users of the portal 12. In general, the multiple log servers 40 may log multiple sessions of multiple users, including the user 10, of multiple portals including the portal 12. Further, any number of log servers 40 may be used. However, for purposes of illustration and example, three log servers 40 are depicted in FIG. 1.

A master log server 42 logs which of the log servers 40 is handling each of the sessions. When session information from a particular session is to be retrieved from the system, the master log server 42 is accessed to determine which of the log servers 40 has logged the particular session.

Figure 4:
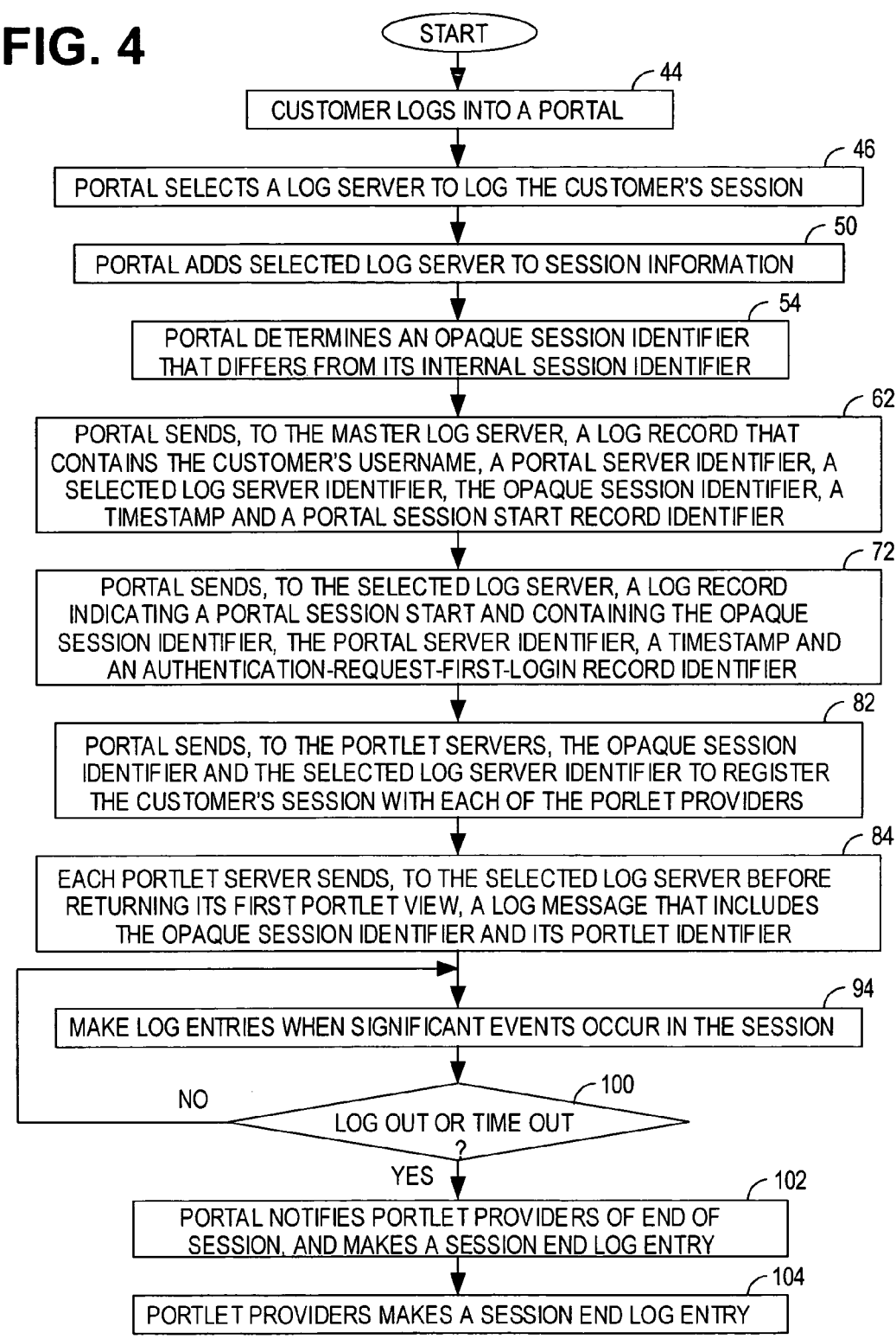
FIG. 4 is a flow chart of an embodiment of a method of logging the session of the user of the portal.

FIG. 4 is a flow chart of an embodiment of a method of logging the session of the user 10 of the portal 12 using the system of FIG. 1.

As indicated by block 44, the user 10 logs into the portal 12 to begin the session. The user 10 logs into the portal 12 using the network-enabled device 20. The login provides a single sign-on for multiple services available during the session.

As indicated by block 46, the portal 12 selects which of the log servers 40 to use to log the session. Various methods can be used to select which of the log servers 40 is to be assigned to the session. For example, a next log server in a round-robin sequence can be selected, a least utilized of the log servers 40 can be selected, or a random one of the log servers 40 can be selected. Other load balancing methods can be used to distribute multiple sessions across multiple log servers 40. For purposes of illustration and example, consider a log server 48 being assigned to the session.

As indicated by block 50, the portal 12 stores a log server identifier 52 that identifies the selected log server 48. This act may include the portal 12 adding the log server identifier 52 to its per-session information maintained for the session.

As indicated by block 54, the portal 12 determines a session identifier 56 to identify the session at various components of the system. The portal 12 adds the session identifier 56 to its per-session information maintained for the session.

The session identifier 56 uniquely identifies the session from a pool of all customer sessions for the time that the session is active on the portal 12. Preferably but optionally, the session identifier 56 differs from an internal session identifier 60 used by the portal 12 to provide the session to the user 10. During the session, the portal 12 and the network-enabled device 20 may communicate the internal session identifier 60 either within URLs or by cookies that are set and retrieved from the network-enabled device 20. By selecting the session identifier 56 to differ from the internal session identifier 60, the internal session identifier 60 is concealed from the log servers 40, the master log server 42, and the portlets 14. This mitigates a chance that an unscrupulous person with access to one of the log servers 40, the master log server 42 and the portlets 14 hijacks the session when in-progress. The session identifier 56 is also referred to herein as an "opaque" session identifier.

As indicated by block 62, the portal 12 sends a log record 64 to the master log server 42. The log record 64 comprises a user identifier 66 such as a user name that identifies the user 10, the selected log server identifier 52, the opaque session identifier 56, a time stamp 68, a portal server identifier 70 that identifies a server of the portal 12, and a record identifier 71 that identifies the log record 64 as a portal-session-start record. The log record 64 is received and stored by the master log server 42. The log record 64 allows downstream systems, including customer care support systems, to use the master log server 42 to find the correct logging server for a customer's single sign-on (SSO) session.

In alternative embodiments, the selection of which log server is to be used and/or the determination of the opaque session identifier 56 is made by a component other than the portal 12. For example, the master log server 42 may determine the opaque session identifier 56 and/or select which log server is to be used for logging the session.

As indicated by block 72, the portal 12 sends a log record 74 to the selected log server 48. The log record 74 comprises the portal server identifier 70, the opaque session identifier 56, a time stamp 78, and a record identifier 80 that identifies the log record 74 as an authentication-request-first-login record. The log record 74 is received and stored by the selected log server 48.

As indicated by block 82, the portal 12 registers the session with providers of the portlets 14 before the portlets 14 for the session have been created and sent back to the portal 12. During session registration, the portal server sends the opaque session identifier 56 and the selected log server identifier 52 to each portal server.

As indicated by block 84, each portal server sends a respective log message to the selected log server 48 before returning a first portlet view to the portal server. The log message includes an identifier of its portlet and the opaque session identifier 56. For example, the portlet 16 sends a log message 86 that includes the opaque session identifier 56 and a portlet identifier 88 that identifies the portlet 16, and the portlet 18 sends a log message 90 that includes the opaque session identifier 56 and a portlet identifier 92 that identifies the portlet 18. Each respective log message is received and stored by the selected log server 48.

As indicated by block 94, after the portal 12 and the portlets 14 have been initialized and have performed their initial log entries, one or more log entries 96 are made to the selected log server 48 when one or more significant events occur in the session. The significant events may occur during interaction of the user 10 with a page produced by the portal 12.

Examples of the significant events include, but are not limited to, interactions between the portal 12 and one or more of the portlets 14, profile changes on the portal 12 and/or one or more of the portlets 14, and service changes on one or more of the portlets 14.

The events may comprise one or more portlet events that occur for any of the portlets 14, and/or one or more portal events that occur for the portal 12.

In response to a portlet event in the session, its portlet sends an associated portlet log entry to the log server 48 identified by the selected log server identifier 52 stored by the portlet. The portlet log entry may include the opaque session identifier 56 for the session and a time stamp, and may identify the portlet event in the session.

In response to a portal event in the session, the portal 12 sends an associated portal log entry to the log server 48 identified by the selected log server identifier 52 stored by the portal. The portal log entry may include the opaque session identifier 56 for the session and a time stamp, and may identify the portal event in the session.

The log server 48 receives and stores the log entries 96 that include the portlet log entries and the portal log entries. The log entries 96 are identified as being associated with the session based on the opaque session identifier 56.

As indicated by block 100, the method comprises determining if the user 10 has logged out of the session or if the session has timed out due to inactivity. If not, subsequent log entries can be made at block 94. If so, as indicated by block 102, the portal 12 notifies the providers of the portlets 14 that the session is ending. The portal 12 sends a session-end log entry to the selected log server 48. As indicated by block 104, the providers of the portlets 14 send session-end log entries to the selected log server. The selected log server 48 receives and stores session-end log entries 106 associated with the session.

Figure 5:
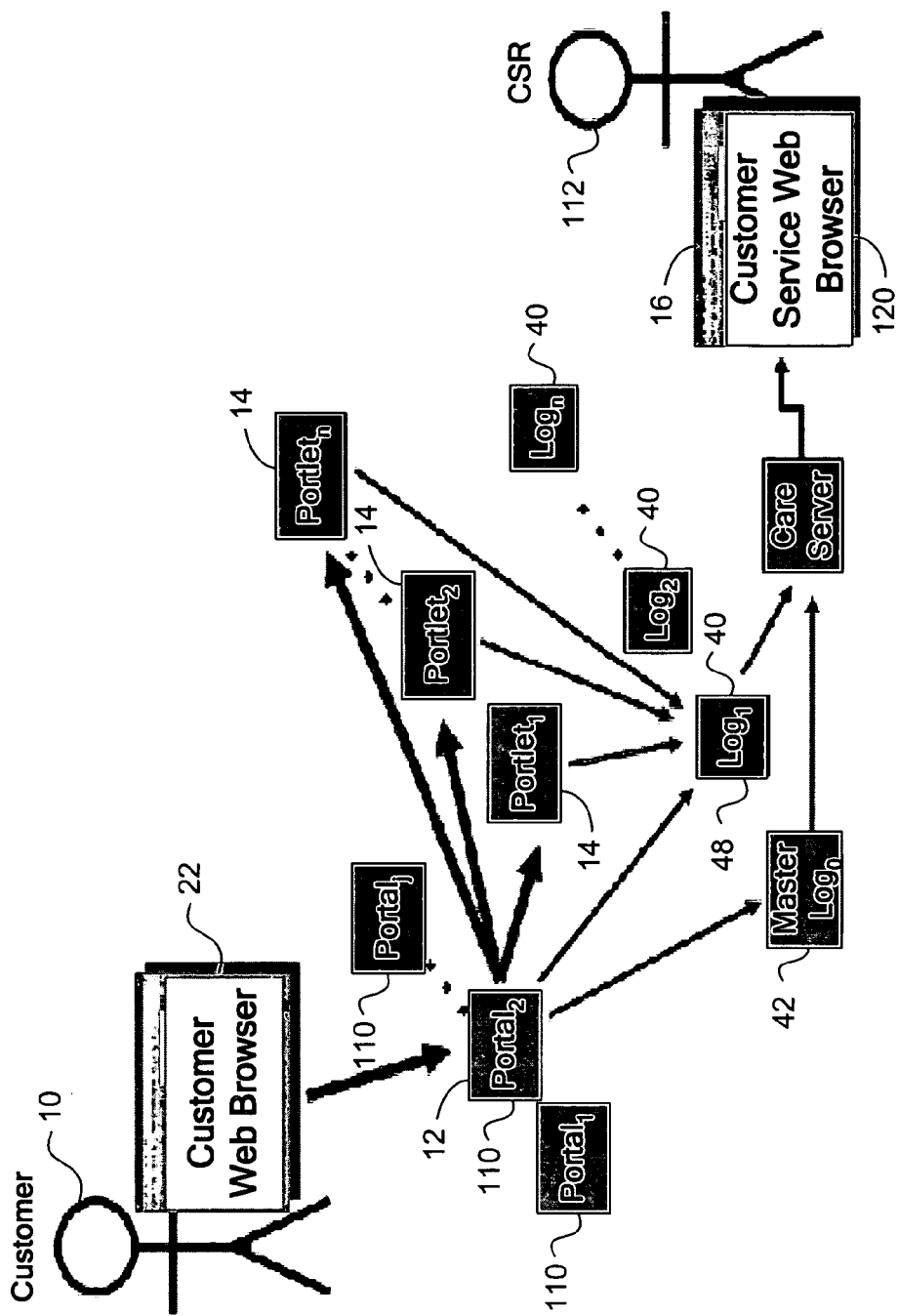
FIG. 5 is a block diagram of a view of the system for multiple portals.

The method of FIG. 4 and the system of FIG. 1 can be used to log sessions of multiple users of multiple portals that use multiple portlet providers. FIG. 5 is a block diagram of a view of the system for multiple portals 110. The multiple portals 110, which include the portal 12, can all be provided by a company to serve its customers including the user 10. Any of the portlets 14 may be provided by either the company itself or another respective entity (e.g. another respective company that is a business partner of the company).

The business has customer service representatives, including a customer service representative 112, who are available to assist its customers. Customers with questions or problems can call a single telephone number to speak to one of the customer service representatives.

The customer service representative 112 uses a computer 116 with a browser or an alternative client program. The computer 116 accesses a customer care server computer 120 that executes a customer service application program. The customer service application program is capable of providing a display of an activity of any of the customer sessions logged by the system. Using the user name or another user identifier as an index, the master log server 42 is capable of telling the customer care server 120 which of the log servers 40 is the authoritative log server for any of the customer sessions. Once the customer care server 120 knows which log server was used to log a particular session, the customer care server 120 pulls information for the particular session from that log server. The information is displayed to the customer service representative 112 using the browser of the computer 116.

The display provides the customer service representative 112 visibility to the customer's entire portal session including each of the portlets that were viewed by the customer. The display can indicate interactions between the portal and each portlet provider, profile changes on the portal and each portlet provider, and service changes on each portlet provider for the session.

For example, consider the customer service representative 112 receiving a telephone call from the user 10 after the user 10 has experienced a problem or has a question regarding one of the services in his/her session with the portal 12. The services were provided by the portlets 14, which sent logging information for the session to the selected log server 48.

Using the user identifier 66 that identifies the user 10, the customer care server 120 retrieves the log server identifier 52 and the opaque session identifier 56 from the master log server 42. Using the log server identifier 52, the customer care server 120 identifies the log server 48 as the one that logged the session of the user 10.

The customer care server 120 sends the opaque session identifier 56 to the log server 48 to retrieve information in the log entries associated with the session. Based on the information, the customer care server 120 outputs a display of activity of the user 10 in the session. The display of activity is viewable by the customer service representative 112 using the computer 116 and the browser.

The display gives the customer service representative 112 visibility into a whole customer experience of the user 10, including how the user 10 is using the services. For example, the display can give visibility to both a digital subscriber line (DSL) service and a messaging unified communications service for which the user 10 is a customer.

Based on the display, the customer service representative 112 can take corrective action for a problem and/or can answer a question during the telephone call with the user 10.

The herein-disclosed acts performed by each of the herein-disclosed embodiments may be directed by one or more computer processors based on respective computer-readable program code stored by a respective computer-readable medium. The data stored by each of the herein-disclosed components are stored by a respective computer-readable medium.

It will be apparent to those skilled in the art that the disclosed embodiments may be modified in numerous ways and may assume many embodiments other than the particular forms specifically set out and described herein. For example, either in addition to or as an alternative to customer care applications, the system can be used for other applications where log information is aggregated and associated on an end-user session basis. Examples of these other applications include, but are not limited to, data mining the session logs, targeted marketing based on usage indicated by the session logs, and usage studies based on the session logs. To cover any of these applications, the customer care server computer 120 can be generically referred to as a computer, where the computer is programmed to perform one or more applications based on the log information.

Figure 6:
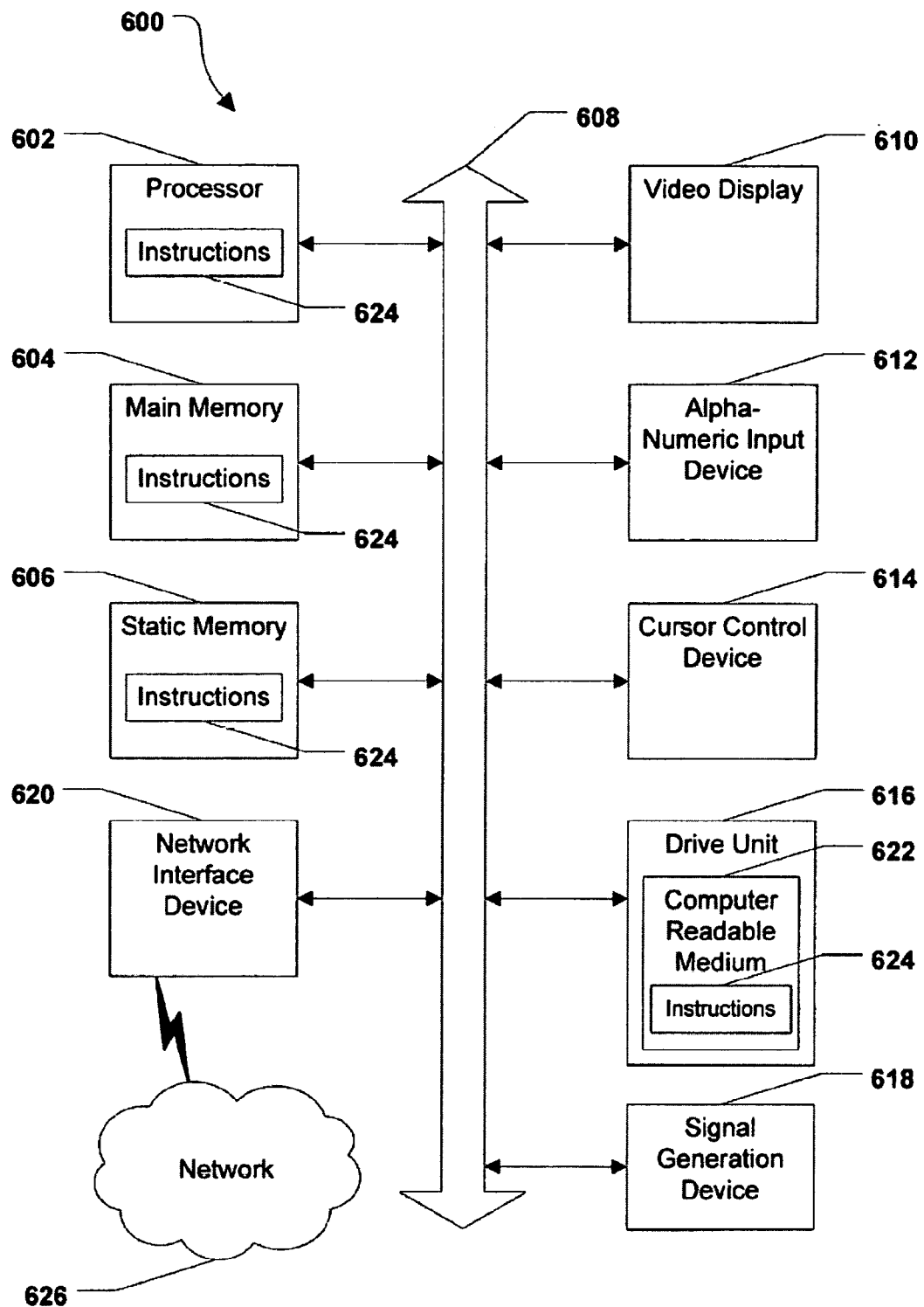
FIG. 6 is a block diagram of an illustrative computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 includes a processor 602, e.g., a central processing unit (CPU), a graphics-processing unit (GPU), or both. Moreover, the computer system 600 includes a main memory 604 and a static memory 606, that can communicate with each other via a bus 608. As shown, the computer system 600 may further include a video display unit 610, such as a liquid crystal display (LCD), an organic light emitting diode (OLED), a flat panel display, a solid-state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video, or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually, and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer-readable storage medium comprising instructions executable by a processor to:
   provide a portal by a portal server via an Internet Protocol Television (IPTV) device, the portal using a plurality of portlets provided by a plurality of portlet servers other than the portal server, wherein each portlet of the plurality of portlets is associated with a particular subscription service of a plurality of subscription services that are provided by a single service provider;
   determine a first session identifier to identify a session, the first session identifier differing from a second session identifier used by the portal to provide the session to a user;
   select a first log server from a plurality of log servers, wherein the first log server logs the session of the user of the portal, wherein each log server of the plurality of log servers is identified by a different log server identifier, and wherein a first log server identifier identifies the first log server;
   transmit the first session identifier to the selected first log server and to a master log server, wherein the first session identifier is used by the portal to identify the session to the master log server and to the selected first log server;
   conceal the second session identifier from the portlets, from the master log server, and from the selected first log server to limit access to the second session identifier;
   send, from the portal server to the master log server, a first log record that includes the first session identifier, a user identifier of the user, a portal server identifier that identifies the portal server, the first log server identifier that identifies the first log server, a first timestamp and a record identifier that identifies the first log record as a portal-session-start record;
   send, from the portal server to the first log server, a second log record that includes the first session identifier, the portal server identifier, a second timestamp, and a record identifier that identifies the second log record as a portal-session-start record;
   send, from the portal server to the portlet servers, the first session identifier and the first log server identifier;
   send, from each of the portlet servers to the first log server based on the first log server identifier, a respective log message that includes the first session identifier and a respective portlet identifier;
   send, from one or more of the portlet servers to the first log server based on the first log server identifier, log entries associated with events in the session;
   store the log entries in the first log server and associate the log entries with the first session identifier;
   retrieve, by a computer from the master log server, the first log server identifier, and the first session identifier based on the user identifier;
   retrieve, by the computer from the first log server identified by the first log server identifier, information in the log entries associated with the first session identifier; and
   output, by the computer, a display of activity of the user in the session based on the information in the log entries associated with the first session identifier.

2. The computer-readable storage medium of claim 1, further comprising instructions executable by a processor to:
   communicate the second session identifier within uniform resource locators or by cookies from a network-enabled device to the portal;
   determine a second session identifier to identify the session, wherein the second session identifier is different from the first session identifier; and
   conceal the second session identifier from the first log server, the master log server, and the portlets to prevent hijacking of the session.

3. The computer-readable storage medium of claim 1, wherein selecting the first log server from the plurality of log servers includes selecting a next log server in a round-robin sequence of the plurality of log servers.

4. The computer-readable storage medium of claim 1, wherein selecting the first log server from the plurality of log servers includes selecting a least utilized server of the plurality of log servers.

5. The computer-readable storage medium of claim 1, wherein selecting the first log server from the plurality of log servers includes randomly selecting the first log server from the plurality of log servers.

6. The computer-readable storage medium of claim 1, wherein the portal determines the first session identifier and wherein the portal selects the first log server from the plurality of log servers.

7. The computer-readable storage medium of claim 1, wherein the master log server determines the first session identifier and wherein the master log server selects the first log server from the plurality of log servers.

8. A system comprising:
   a master log server;
   a plurality of log servers, wherein each log server of the plurality of log servers is identified by a different log server identifier, and wherein each log server of the plurality of log servers is configured to store log entries associated with a session identifier;
   a plurality of portlet servers, wherein each portlet server is configured to:
      provide a plurality of portlets, wherein each portlet of the plurality of portlets is associated with a particular subscription service of a plurality of subscription services that are provided by a single service provider, and wherein each portlet of the plurality of portlets is identified by a portlet identifier;
send a log message to a first log server that includes a first session identifier and the portlet identifier;
send log entries associated with events in a session of a user to the first log server;
a portal server to provide a portal via an Internet Protocol Television (IPTV) device, wherein the portal server is configured to:
use the plurality of portlets;
transmit an first session identifier to the master log server and to a first log server that is selected from the plurality of log servers, wherein a first log server identifier identifies the first log server, wherein the first session identifier is used by the portal to identify a session to the master log server and the first log server;
use an second session identifier to provide the session to a user;
conceal the second session identifier from the plurality of portlets, from the master log server, and from the first log server, to limit access to the second session identifier;
send a first log record that includes the first session identifier, a user identifier of the user, a portal server identifier that identifies the portal server, the first log server identifier that identifies the first log server, a first timestamp, and a record identifier that identifies the first log record as a portal-session-start record;
send a second log record to the first log server, the second log record including the first session identifier, the portal server identifier, a second timestamp, and a record identifier that identifiers the second log record as a portal-session-start record;
send the first session identifier and the first log server identifier to the plurality of portlet servers; and
an interactive display configured to:
receive information corresponding to the activity of the user, wherein the information includes at least the user identifier;
retrieve the first log server identifier and the first session identifier from the master log server based at least in part on the received information;
retrieve the log entries associated with the first session identifier from the first log server based on the first session identifier;
display the retrieved log entries associated with the activity of the user in the session to the interactive display.

9. The system of claim 8, wherein the portal server is configured to determine the first session identifier to identify the session and its associated portlet log entries in the first log server, the first session identifier differing from the second session identifier used by the portal server to provide the session to the user.

10. The system of claim 9, wherein the master log server is to receive and store the first log record from the portal server, the first log record including the first session identifier, a user identifier of the user and the first log server identifier that identifies the first log server.

11. A method comprising:
providing a portal by a portal server via an Internet Protocol Television (IPTV) device, the portal using a plurality of portlets provided by a plurality of portlet servers other than the portal server, wherein each portlet of the plurality of portlets is associated with a particular subscription service of a plurality of subscription services that are provided by a single service provider;
selecting a first log server from a plurality of log servers, wherein the first log server logs a session of a user of the portal, wherein each log server of the plurality of log servers is identified by a different log server identifier, and wherein a first log server identifier identifies the first log server;
determining a first session identifier to identify the session, the first session identifier differing from a second session identifier used by the portal to provide the session to the user;
transmitting the first session identifier to the selected log server and to a master log server, wherein the first session identifier is used by the portal to identify the session to the master log server and to the selected log server;
concealing the second session identifier from the portlets, from the master log server, and from the selected log server to limit access to the second session identifier;
sending, from the portal server to the master log server, a first log record that includes the first session identifier, a user identifier of the user, a portal server identifier that identifies the portal server, the first log server identifier that identifies the first log server, a first timestamp and a record identifier that identifies the first log record as a portal-session-start record;
sending, from the portal server to the first log server, a second log record that includes the first session identifier, the portal server identifier, a second timestamp, and a record identifier that identifies the second log record as a portal-session-start record;
sending, from the portal server to the portlet servers, the first session identifier and the first log server identifier;
sending, from each of the portlet servers to the first log server based on the first log server identifier, a respective log message that includes the first session identifier and a respective portlet identifier;
sending, from one or more of the portlet servers to the first log server based on the first log server identifier, log entries associated with events in the session;
storing the log entries in the first log server and associating the log entries with the first session identifier;
retrieving, by a computer from the master log server, the first log server identifier, and the first session identifier based on the user identifier;
retrieving, by the computer from the first log server identified by the first log server identifier, information in the log entries associated with the first session identifier; and
outputting, by the computer, a display of activity of the user in the session based on the information in the log entries associated with the first session identifier.

* * * * *